United States Patent
Hirota

(10) Patent No.: US 7,581,628 B2
(45) Date of Patent: Sep. 1, 2009

(54) ELECTROMAGNETIC CLUTCH

(75) Inventor: Isao Hirota, Kanuma (JP)

(73) Assignee: GKN Driveline Torque Technology KK, Tochigi-Shi (JP)

( * ) Notice: Subject to any disclaimer, the term of this patent is extended or adjusted under 35 U.S.C. 154(b) by 232 days.

(21) Appl. No.: 11/472,636

(22) Filed: Jun. 21, 2006

(65) Prior Publication Data

US 2006/0289265 A1    Dec. 28, 2006

(30) Foreign Application Priority Data

Jun. 22, 2005   (JP)  ............................. 2005-182122

(51) Int. Cl.
    *F16D 27/115*   (2006.01)
(52) U.S. Cl. .................. 192/84.91; 192/84.96; 335/296
(58) Field of Classification Search .............. 192/84.91, 192/84.96
    See application file for complete search history.

(56) References Cited

U.S. PATENT DOCUMENTS

| 3,172,514 | A | * | 3/1965 | Hansen | 192/84.96 |
| 5,123,157 | A | * | 6/1992 | Cerny | 29/607 |
| 6,315,099 | B1 | * | 11/2001 | Ikeda et al. | 192/53.2 |

FOREIGN PATENT DOCUMENTS

JP   11-153157   6/1999

* cited by examiner

*Primary Examiner*—Richard M. Lorence
*Assistant Examiner*—John V. Ligerakis
(74) *Attorney, Agent, or Firm*—Morrison & Foerster LLP

(57) ABSTRACT

An electromagnetic clutch 1 is disclosed having first and second relative rotary members 3, 5, an electromagnet 11 having a coil 7 and a yoke 9, a rotor 13 placed in close proximity to the electromagnet 11 and permeating magnetic field lines through the yoke 9, a friction clutch 15 operative to transfer drive torque between the first and second relative rotary members 3, 5, and an armature 17 permeating magnetic field lines coming from the rotor 13 for controlling coupling the friction clutch. The rotor 13 includes first and second magnetic members 21, 23 for forming at least one magnetic flux loop 19 and the first and second magnetic members 21, 23 are made of materials different from each other.

16 Claims, 7 Drawing Sheets

ELECTROMAGNETIC CLUTCH

BACKGROUND OF THE INVENTION

The present invention relates to an electromagnetic clutch device wherein drive torque is connected or disconnected between a pair of rotary members using a magnetic force.

Japanese Patent Application Laid-open No. 11-153157 discloses a power transfer device wherein an electromagnet is arranged to attract an armature to cause a clutch to generate a friction force to transfer drive power. An electromagnetic clutch, forming a part of such a power transfer device, allows magnetic field lines to be permeated through a yoke, a rotor, a friction clutch and an armature of the electromagnet depending on a value of electric current flowing through a coil of the electromagnet thereby forming a magnetic flux loop. To this end, attempts have heretofore been made to use material made of iron for the yoke, the rotor, the friction clutch and the armature of the electromagnet. In particular, material made of carbon steel has been generally used for the rotor of the electromagnetic clutch with a view to preventing a drop in permeability of the magnetic field lines.

However, with only attempt made in merely selecting material with favorable permeability of the magnetic field lines, issues arise with the occurrence of strength poverty of the electromagnetic clutch mounted to an associated peripheral member such as a stationary case or strength poverty of the electromagnetic clutch in delivering drive torque at a given rate. This causes limitations in designing the electromagnetic clutch in another application as a device.

SUMMARY OF THE INVENTION

The present invention has been completed with a view to addressing the above issues and has an object to provide an electromagnetic clutch that can eliminate limitations resulting from a mounting status associated with a peripheral member while broadening an application range of an application design as a device.

To achieve the above object, a main aspect of the present invention provides an electromagnetic clutch comprising first and second rotary members rotatable relative to each other, an electromagnet having a coil and a yoke, a rotor placed in close proximity to the electromagnet and permeating magnetic field lines generated by the electromagnet, a friction clutch operative to transfer drive torque between the first and second rotary members, an armature permeating magnetic field lines coming from the rotor to control coupling of the friction clutch, wherein the rotor includes first and second magnetic members for forming magnetic flux loops and the first and second magnetic members are made of materials different from each other.

DETAILED DESCRIPTION OF THE PREFERRED EMBODIMENTS

Figure 1:
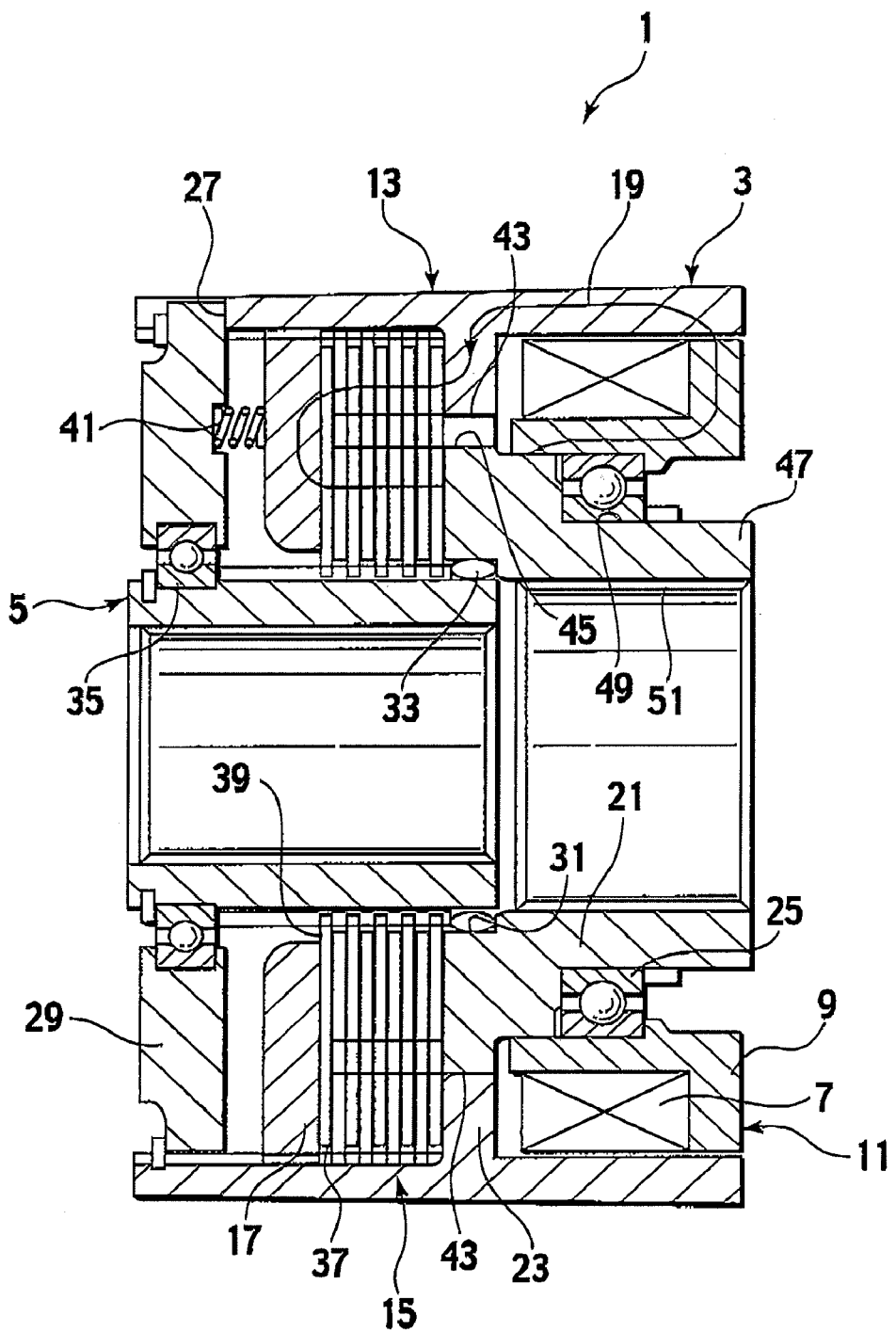
FIG. 1 is a cross-sectional view of an electromagnetic clutch of a first embodiment according to the present invention.

Hereinafter, various embodiments of electromagnetic clutches of the present invention are described with reference to the accompanying drawings.

First Embodiment

Initially, a first embodiment of the present invention is described with reference to FIGS. 1 and 2.

An electromagnetic clutch 1 of the first embodiment is comprised of first and second relative rotary members 3, 5, an electromagnet 11 having a coil 7 and a yoke 9, a rotor 13 placed in close proximity to the electromagnet 11 to permeate magnetic fluxes through the yoke 9, a friction clutch 15 for transferring drive torque between the first and second relative rotary members 3, 5, and an armature 17 through which the magnetic fluxes coming from the rotor 13 are permeated for coupling the friction clutch 15. With the electromagnetic clutch 1 of the present embodiment, the rotor 13 includes first and second magnetic members 21, 23 by which at least one magnetic flux loop is established and which are made of different materials.

As shown in FIG. 1, the first rotary member 3 has a bearing 25 that rotatably supports an inner periphery of the yoke 9 of the electromagnet 11. Further, the first rotary member 3 supports a stationary member (not shown) via the bearing 25. Moreover, the electromagnet 11 is fixedly secured to the stationary member (not shown). The first rotary member 3 has one end whose outer periphery has an engagement recess 27 in non-rotating capability. The engagement recess 27 is held in engagement with a cover member 29. Also, the first rotary member 3 has an inner periphery formed with a concave portion 31 and has an engagement recess 27 in non-rotating capability. The engagement recess 27 is held in engagement with a cover member 29. The second rotary member 5 is supported to be rotatable relative to the first rotary member 3 via a bearing 33, located in the concave portion 31, and a bearing 35 placed radially inward of the cover member 29.

The electromagnet 11, composed of the coil 7 and the yoke 9, is fixedly secured to the stationary member (not shown). The rotor 13 is placed in close proximity to the electromagnet 11 on one side thereof.

The rotor 13 is integrally formed with the first rotary member 3. The rotor 13 is comprised of the first and second magnetic members 21, 23 and when the electromagnet 11 is energized, magnetic field lines are permeated through the yoke 9, the rotor 13, the friction clutch 15 and the armature 17 in a magnetic flux loop 19.

The friction clutch 15 is comprised of a plurality of outer friction plates 37, spline coupled to an inner periphery of the first rotary member 3, and a plurality of inner friction plates 39 spline coupled to an outer periphery of the second rotary member 5. When the electromagnet 11 is energized, the electromagnet 11 attracts the armature 17 to couple the friction clutch 15. The armature 17 is spline coupled to an inner periphery of the first rotary member 3 on one side of the friction clutch 15. Further, an urging member 41 is disposed between the armature 17 and the cover member 29. The urging member 41 allows the armature 17 to be placed in a regular position. As the electromagnet 11 is energized to cause the friction clutch 15 to be coupled, the first and second rotary members 3, 5 are coupled to transfer drive torque.

Consideration is made on the rotor 13 of the electromagnetic clutch 1 in consideration of a permeating status of magnetic field lines, a mounting status with respect to an associated peripheral member and a delivery status of drive power. Hereunder, the rotor 13 is described with reference to such consideration.

Figure 2:
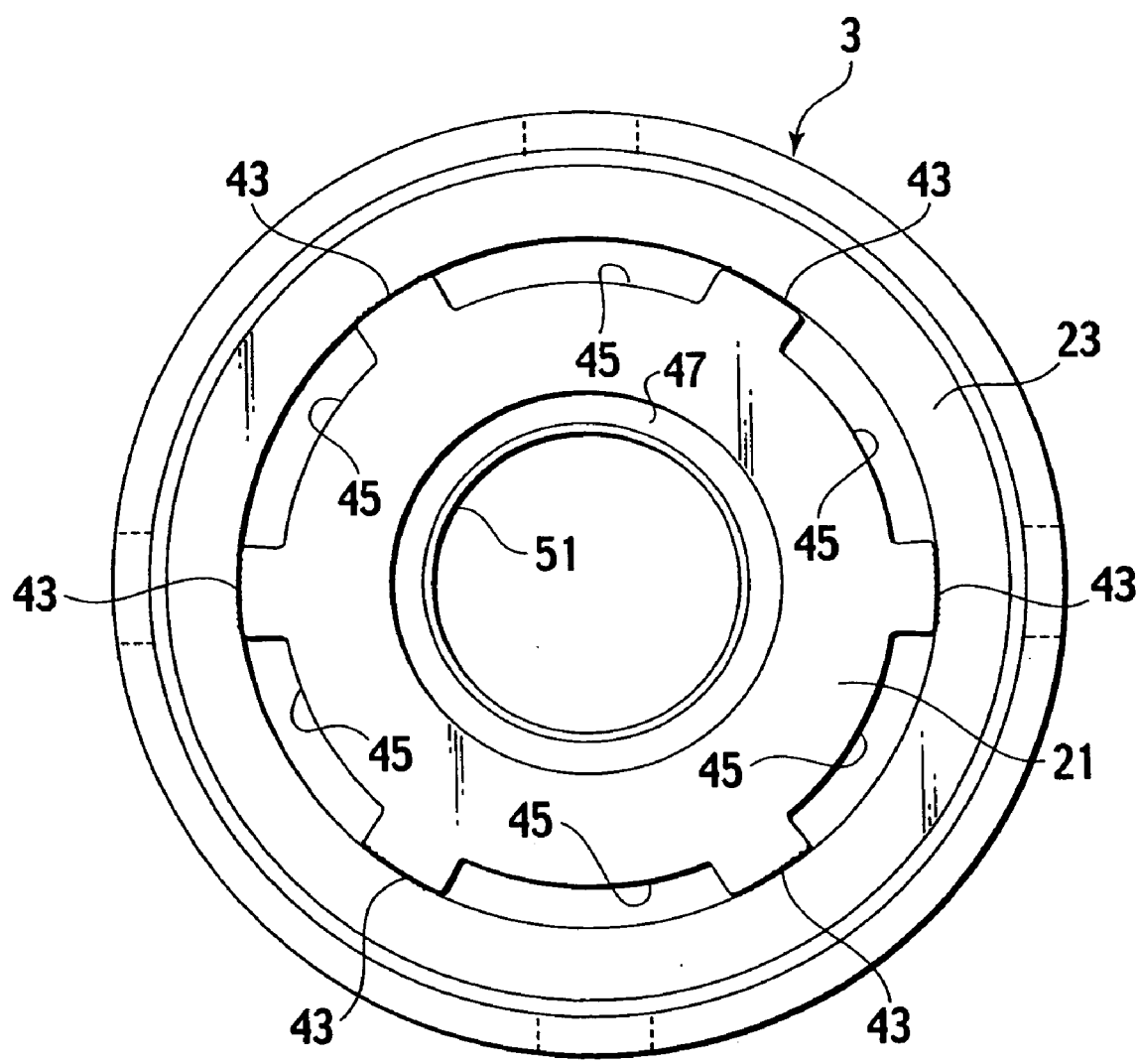
FIG. 2 is a side view of a first rotary member 3 forming part of the electromagnetic clutch shown in FIG. 1.

As shown in FIGS. 1 and 2, the rotor 13 is integrally formed with the first rotary member 3 and comprised of the first and second magnetic members 21, 23. The first magnetic member 21 is radially inward of the second magnetic member 23 and the first and second magnetic members 21, 23 are directly joined to each other by means of a plurality of joint portions 43. The first magnetic member 21 has an outer periphery formed with openings 45 with a suitably circumferential distance at positions adjacent to the plural joint portions 43, respectively. These openings 45 enable the formation of the magnetic flux loop 19 to permeate the magnetic field lines through the yoke 9, the rotor 13, the friction clutch 15 and the armature 17. Also, the first magnetic member 21 has a coupling section 51 and is formed with an axially extending cylindrical section 47 in an area outside the magnetic flux loop 19. The cylindrical section 47 has an outer periphery provided with a support section 49. The support section 49 allows the bearing 25 to rotatably support the first rotary member 3 on the stationary member (not shown). Moreover, the coupling section 51 is formed in an inner periphery of the cylindrical section 47. The coupling section 51 allows the first rotary member 3 for connection to the other drive member (not shown).

Thus, the first magnetic member 21 has a section in which the magnetic flux loop 19 is formed, the support section 49 adapted to be supported by the stationary member (not shown), and the coupling section 51 for connection to the other drive member (not shown). Accordingly, the rotor 13 needs to be made of materials selected in consideration of a permeating status of the magnetic field lines, a mounting status with respect to an associated peripheral member and a delivery status of drive power. Hereunder, materials of the rotor 13 are described below.

The first magnetic member 21 is made of material such as, for instance, carbon steel (S30C) "JIS G 4051" for machine structural use that has a higher carbon content than that of carbon steel (S10C) "JIS G 4051" for machine structural use to be employed for the second magnetic member 23. Further, the first magnetic member 21 has higher material rigidity than that of the second magnetic member 23. Additionally, the coupling section 51 of the first magnetic member 21 is subjected to surface-hardening treatment upon conducting heat treatment such as carburizing, nitriding and high-frequency hardening. Also, surface-hardening treatment may be implemented through shot blasting and vapor deposition or surface modification may be carried out using chemical components. Moreover, the concave portion 31, accommodating therein the bearing 33, and the support section 49, with which the bearing 25 is held in abutting engagement, are subjected to surface treatment with a view to preventing the occurrence of fretting wear.

With such an electromagnetic clutch 1, since the first and second magnetic members 21, 23 are made of different materials, allowing rotor materials to be combined in more than two kinds of materials minimizes limitations caused by the mounting status with respect to the associated peripheral member and the delivery status of drive power. This results in capability of preventing a unit device of an electromagnetic clutch or an apparatus incorporating the electromagnetic clutch from being complicated and largely sized in structure while broadening an application range of an application design.

Further, since the first magnetic member 21, which needs to take the mounting status with respect to the associated peripheral member and the delivery status of drive power into consideration, is selectively made of hard material with increased carbon content, a drop occurs in a permeability of magnetic field lines in some degree but the more advantageous effect results in with an increase in an application range of an application design.

Furthermore, in a case where material having a property with no need to implement surface treatment is selected for the first magnetic member 21 depending on a coupling status between the first magnetic member 21 and the other peripheral member, no surface treatment needs to be carried out.

Moreover, the first magnetic member 21, which needs to take the mounting status with respect to the associated peripheral member and the delivery status of drive power into consideration, is made of material with increased rigidity and has capability of bearing phenomena such as torsion or bending resulting from drive torque. This results in capability of preventing a unit device of an electromagnetic clutch or an apparatus incorporating the electromagnetic clutch from being complicated and largely sized in structure while broadening an application range of an application design.

In addition, since the cylindrical section 47 of the first magnetic member 21 is formed with the coupling section 51 for connection to the other drive member, the first magnetic member 21 can sustain adequate coupling strength on drive torque. Also, the first magnetic member 21, having the cylindrical section 47, is made harder than that of the second magnetic member 23. This allows the cylindrical section 47 to be easily set to be an input and output interface for drive torque. Also, since the cylindrical section 47 is enhanced to extend in an axial direction by a given length, adequate strength can be ensured in a reliable manner.

Further, since the first magnetic member 21 is smaller in diameter than the second magnetic member 23, selecting material with increased rigidity enables the suppression of an increase in radial thickness that would be needed in consideration the mounting status with respect to an associated peripheral member and a delivery status of drive torque. Furthermore, using the first magnetic member 21, placed radially inward of the second magnetic member 23, enables a profile design to be made so as to allow the first magnetic member 21 to be mounted onto the associated peripheral member and to deliver drive power. This results in capability of broadening an application range of an application design of a unit device of an electromagnetic clutch or an apparatus incorporating the electromagnetic clutch while suppressing an increase in size.

Furthermore, since the coupling section 51 of the first magnetic member 21, to be connected to the other rotary member, is subjected to surface hardening treatment, the coupling section 51 can have increased strength. Consequently, this results in an increase in reliability of the rotor 13, through which drive torque is input or output, enabling an application range of an application design to be broadened.

In addition, since the cylindrical section 47 of the first magnetic member 21 is formed with the support section 49 to be supported by a stationary member, material can be selected in consideration of the support member 49. Moreover, the first magnetic member 21 is made harder than the second magnetic member 23, a shape of the support member 49 can be easily set.

Second Embodiment

A second embodiment is described below with reference to FIG. 3.

An electromagnetic clutch 101 of the present embodiment is comprised of first and second relative rotary members 103, 105, an electromagnet 111 including a coil 107 and a yoke 109, a rotor 113 placed in close proximity to the electromagnet 111 to permeate magnetic field lines through the yoke 9, a main clutch (friction clutch) 115 through which drive torque is transferred between the first and second relative rotary members 103, 105, and an armature 117 operative to permeate magnetic field lines, delivered from the rotor 113, for controlling the coupling of a pilot clutch (friction clutch) 125. With the electromagnetic clutch 101 of the present embodiment, the rotor 113 is comprised of first and second magnetic members 121, 123, for establishing at least one magnetic flux loop 119, which are made of different materials.

Figure 3:
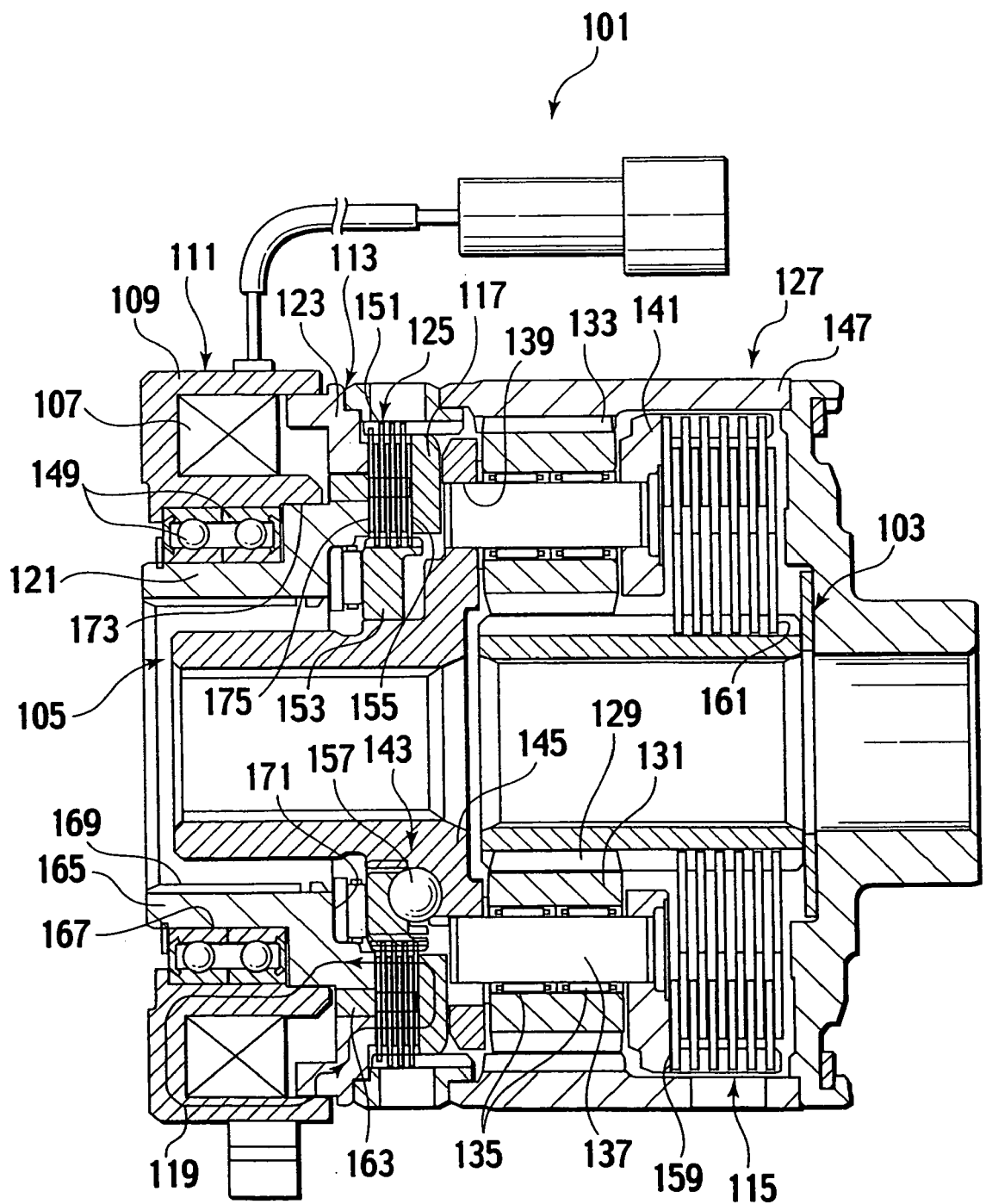
FIG. 3 is a cross-sectional view of an electromagnetic clutch 101 of a second embodiment according to the present invention.

As shown in FIG. 3, the first rotary member 103 is accommodated in a housing 127. The first rotary member 103 has an outer periphery formed with a geared portion 129. A plurality of gears 131 is held in meshing engagement with the geared portion 129. Moreover, the gears 131 are held in meshing engagement with a gear portion 133 formed on an inner periphery of the housing 127. The gears 131 are rotatably supported on a plurality of shafts 137, respectively, by means of bearings 135, 135. The shafts 137 have both ends supported by a support section 139 of the second rotary member 105 and a pressure support member 141. Further, the second rotary member 105, formed with a cam section 145 forming a cam mechanism 143, is accommodated in the housing 127 for rotating capability relative to the first rotary member 103.

The housing 127 is comprised of the rotor 113 and a housing body 147 that are integrally connected to each other by electron beam welding. Further, the housing 127 is supported on a stationary member (not shown) and rotatable via bearings 149, 149 mounted inside the yoke 109 of the electromagnet 111 fixedly secured to the stationary member (not shown).

The electromagnet 111, comprised of the coil 107 and the yoke 109, is fixedly secured to the stationary member (not shown). The rotor 113 is placed in close proximity to one side of the electromagnet 111.

The rotor 113 is integrally formed with the housing 127. The rotor 113, comprised of the first and second magnetic members 121, 123 that will be described later, creates the magnetic flux loop 119 for permeating the magnetic filed lines to the yoke 109, the rotor 113, the pilot clutch 125 and the armature 117 when the electromagnet 111 is energized.

The pilot clutch 125 is comprised of a plurality of outer friction plates 151 spline coupled to the inner periphery of the housing 127, and a plurality of inner friction plates 155 spline coupled to an outer periphery of a cam ring 153 held in engagement with an outer periphery of the second rotary member 105. When the electromagnet 111 is energized, the armature 117 is attracted toward the electromagnet 111 to cause the pilot clutch 125 to be coupled. The armature 117 is disposed on the pilot clutch 125 at one side thereof. As the pilot clutch 125 is coupled upon energizing the electromagnet 111, differential rotation occurs between the cam ring 153 and the second rotary member 105, causing the cam mechanism 143 to generate a cam thrust force.

The cam mechanism 143 is comprised of the cam ring 153, the cam section 145 formed on the second rotary member 105, and cam balls 157 disposed between the cam ring 153 and the cam section 145. As the cam mechanism 143 generates a cam thrust force (force acting in an axial direction), the second rotary member 105 is caused to shift in the axial direction to press the gears 131. This allows the gears 131 to move in the axial direction to press the pressure support member 141. This causes the pressure support member 141 to move in the axial direction to press the main clutch 115, which is consequently coupled.

The main clutch 115 is comprised of a plurality of outer friction plates 159 spline coupled to one side of the pressure support member 141, and a plurality of inner friction plate 161 spline coupled to the outer periphery of the second rotary member 105. As the electromagnet 111 is energized to cause the main clutch 115 to be coupled, the first and second rotary members 103, 105 are coupled to transfer drive torque.

Considerations are made on the rotor 113 of the electromagnetic clutch 101 in terms of a permeating status of magnetic field lines, a mounting status with respect to an associated peripheral member and a delivery status of drive power. Hereunder, the rotor 113 is described in this respect.

The rotor 113, integrally formed with the housing 127, is comprised of the first and second magnetic members 121, 123. The first magnetic member 121, placed in radially inward of the second magnetic member 123, is unitized with the second magnetic member 123 intervening non-magnetic member 163 made of copper or aluminum alloy. The non-magnetic member 163 is formed at circumferentially spaced position with a suitable distance. In an alternative, the non-magnetic member 163 may be formed on an entire circumferential area in a ring shape. As the electromagnet 111 is energized, the non-magnetic member 163 is able to form a magnetic flux loop 119 in which magnetic field lines are permeated through the yoke 109, the rotor 113, the pilot clutch 125 and the armature 117. Moreover, the first magnetic member 121 is formed with a coupling section 169 and has a cylindrical section 165 axially extending in an area outside the magnetic flux loop 119. The coupling section 169 allows the other drive member (not shown) and the housing 127 to be coupled to each other. Further, with the first magnetic member 121, the cylindrical section 165 has one end formed with a rest portion 171 that bears a cum thrust of the cam ring 153 moved toward the electromagnet 111 due to cam thrust generated by the cam mechanism 143.

Thus, the first magnetic member 121 includes a section for forming the magnetic flux loop 119, a support section 167 supported on a stationary member (not shown), the coupling section 169 for connection to the other drive member (not shown) and the rest portion 171 that bears cam thrust. Accordingly, the rotor 113 needs to be made of material selected in consideration of a permeating status of magnetic field lines, a mounting status with respect to an associated peripheral member and a delivery status of drive power. Hereunder, materials of the rotor 113 are described.

The first magnetic member 121 is made of material such as, for instance, carbon steel casting (SCM415H) "JIS G 5101" that has a higher carbon content than that of carbon steel (S10C) "JIS G 4051" for machine structural use to be employed for the second magnetic member 123. Further, the first magnetic member 121 has higher material rigidity than that of the second magnetic member 123. Additionally, the coupling section 169 of the first magnetic member 121 is subjected to surface-hardening treatment upon conducting heat treatment such as carburizing, nitriding and high-frequency hardening. Also, surface-hardening treatment may be implemented through shot blasting and vapor deposition or surface modification of chemical components may be carried out. Moreover, the support section 167, with which the bearings 149, 149 are held in abutting engagement, is subjected to surface treatment with a view to preventing the occurrence of fretting wear. Additionally, a facing section 173, facing the yoke 109 of the electromagnet 111 of the first magnetic member 121, and a facing section 175, facing the pilot clutch 125, are cut or during the formation of these component parts, these component parts are coated with carbon prevention material to provide improved magnetic flux permeability.

With such an electromagnetic clutch 101, since the first and second magnetic members 121, 123 are made of different materials, allowing rotor materials to be combined with more than two kinds of materials minimizes limitations caused by the mounting status with respect to the associated peripheral member and the delivery status of drive power. This results in capability of preventing a unit device of an electromagnetic clutch or an apparatus incorporating the electromagnetic clutch from being complicated and largely sized in structure while broadening an application range of an application design.

Further, since the first magnetic member 121, which needs to take the mounting status with respect to the associated peripheral member and the delivery status of drive power into consideration, is made of hard material with increased carbon content, a drop occurs in a permeability of magnetic field lines in some degree but the more advantageous effect results in with an increase in an application range of an application design.

Moreover, the first magnetic member 121, which needs to take the mounting status with respect to the associated peripheral member and the delivery status of drive power into consideration, is made of material with increased rigidity and has capability of bearing phenomena such as torsion or bending resulting from drive torque. This enables an increase in an application range of an application design.

In addition, since the cylindrical section 165 of the first magnetic member 121 is formed with the coupling section 169 for connection to the other drive member, the first magnetic member 21 can sustain adequate coupling strength on drive torque. Also, the first magnetic member 121, having the cylindrical section 169, is made harder than the second magnetic member 123. This allows the cylindrical section 169 to be easily set to be an input and output interface for drive torque.

Further, since the first magnetic member 121 is smaller in diameter than the second magnetic member 123, selecting material with increased rigidity enables the suppression of an increase in radial thickness that would be needed in consideration the mounting status with respect to an associated peripheral member and a delivery status of drive torque. Furthermore, using the first magnetic member 121, placed radially inward of the second magnetic member 123, enables a profile design to be made so as to allow the first magnetic member 121 to be mounted onto the associated peripheral member and to deliver drive power. This results in capability of preventing a unit device of an electromagnetic clutch or an apparatus incorporating the electromagnetic clutch from being largely sized in structure while broadening an application range of an application design.

Furthermore, since the coupling section 169 of the first magnetic member 121 for connection to the other rotary member is subjected to surface hardening treatment, the coupling section 169 can have increased strength. Consequently, this results in improvement in reliability of the rotor 113, through which drive torque is input or output, enabling the achievement of broadening an application range of an application design.

In addition, since the cylindrical section 165 of the first magnetic member 121 is formed with the support section 167 to be supported by a stationary member, material can be selected in consideration of the support member 167. Moreover, the first magnetic member 121 is made harder than the second magnetic member 123, a shape of the support member 49 can be easily set.

Third Embodiment

A third embodiment is described below with reference to FIG. 4.

An electromagnetic clutch 201 of the present embodiment is comprised of a diff case 203 and a differential mechanism 205 (first and second relative rotary members), an electromagnet 211 including a coil 207 and a yoke 209, a rotor 213 placed in close proximity to the electromagnet 211 to permeate magnetic field lines through the yoke 209, a main clutch (friction clutch) 215 through which drive torque is transferred between the first and second relative rotary members 203, 205, and an armature 217 operative to permeate the magnetic field lines, delivered from the rotor 213, for controlling the coupling of a pilot clutch (friction clutch) 229. With the electromagnetic clutch 201 of the present embodiment, the rotor 213 is comprised of first and second magnetic members 221, 223, for establishing at least one magnetic flux loop 219, which are made of different materials. The first magnetic member 221 is disposed in an area radially outward of the second magnetic member 223 and includes a disc portion (cylindrical section) 225 radially extending in an area outside the magnetic loop. The disc portion 225 plays a role as a transfer member to transfer drive torque of a gear (the other drive member) 227 of a power delivery system.

Figure 4:
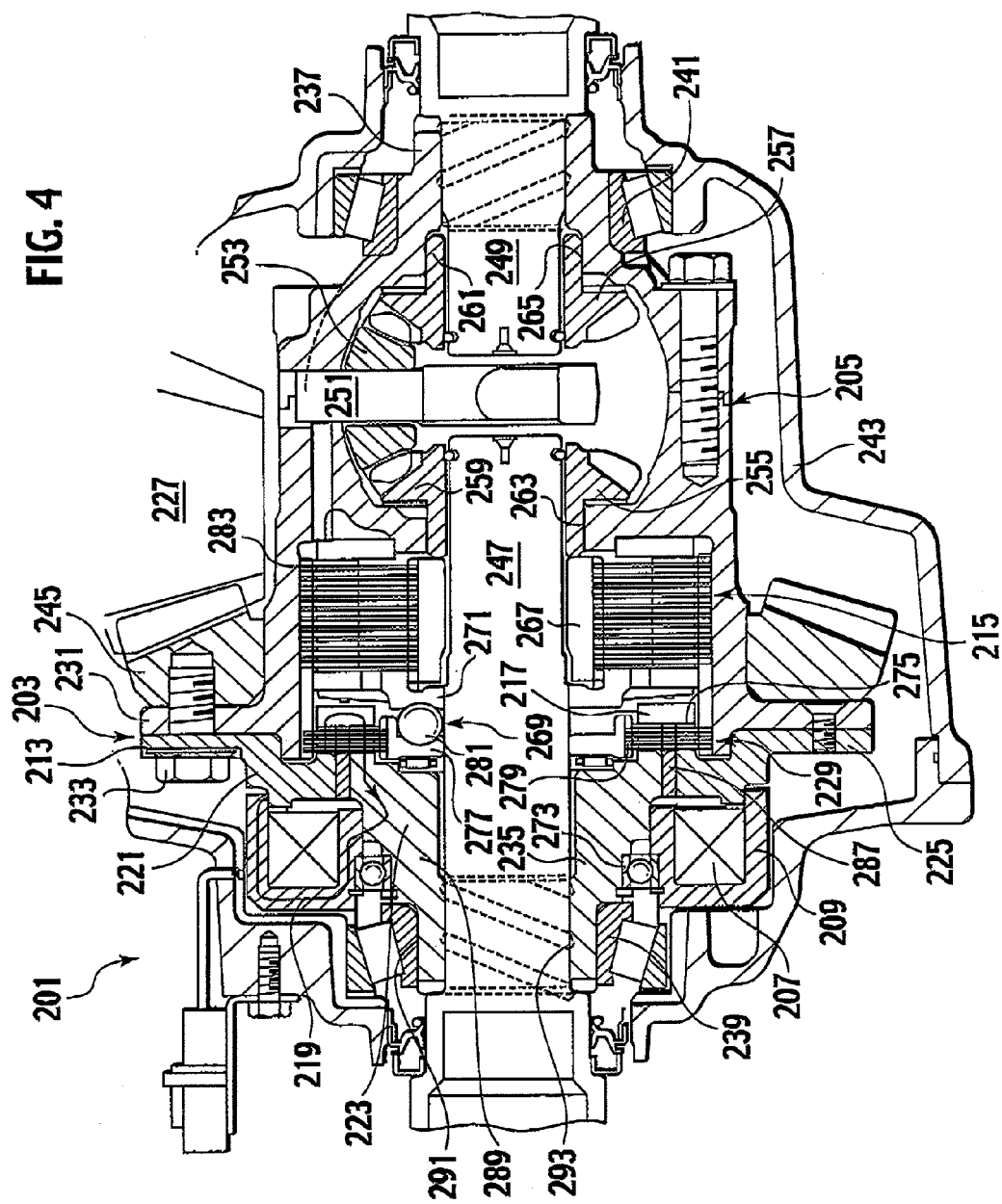
FIG. 4 is a cross-sectional view of an electromagnetic clutch 201 of a third embodiment according to the present invention.

As shown in FIG. 4, the diff case 203 is comprised of the rotor 213 and a case body 231, both of which are unitarily fixed to each other by means of bolts 233. Moreover, the diff case 203 is formed with boss portions 235, 237. The boss portions 235, 237 allows the diff case 203 to be rotatably supported by a diff carrier 243 by means of bearings 239, 241. In addition, a ring gear 245 is fixedly secured to the diff case 203 by means of the bolts 233. The ring gear 245 is held in meshing engagement with the gear 227 of the power delivery system, through which drive power is transferred from an engine, for transferring drive power of the engine to the diff case 203. This drive power allows the diff case 203 to be drivably rotated, causing the differential mechanism 205 to deliver drive power to right and left axles 247, 249.

The differential mechanism 205 is comprised of a pinion shaft 251, a pinion gear 253 rotatably supported by the pinion shaft 251, and side gears 255, 257 held in meshing engagement with the pinion gear 253 and connected to the right and left axles 247, 249.

The pinion shaft 251 has both ends engaging the diff case 203 and drivably rotated with the diff case 203 in unitary motion. The pinion gear 253 transfers drive power from the engine to the right and left side gears 255, 257 and is supported on the pinion shaft 251 to be drivably rotated when a differential rotation exists between the associated right and left side gears 255, 257.

The side gears 255, 257 are formed with boss portions 259, 261, respectively, which are supported by support sections 263, 265 formed in the diff case 203. The boss portions 259, 261 of the side gears 255, 257 have inner radial areas to which the axles 247, 249 are spline connected. Drive power is transferred to right and left wheels via the axles 247, 249. Moreover, the axle 247, connected to the side gear 255, has an outer periphery to which a sun gear 267 is spline connected. Also, as the electromagnetic clutch 201 causes the side gear 255 to be coupled to the diff case 203, a differential motion falls in a locked condition.

The electromagnetic clutch 201 is comprised of the electromagnet 211, the armature 221 disposed to be axially movable in response to magnetic attraction force of the electromagnet 211, a pilot clutch 229 operative to be coupled in response to the axial movement of the armature 217, a cam mechanism 269 operative to generate a thrust force when the pilot clutch 229 is coupled, a pressure ring 271 for transferring the thrust force from the cam mechanism 269 to the main clutch 215, and the main clutch 215 operative to be coupled in response to the axial movement of the pressure ring 271.

The electromagnet 211, comprised of the coil 207 and the yoke 209, is fixedly secured to the diff carrier (stationary member) 243. Also, the yoke 209 has an inner periphery carrying a bearing 273 that supports the boss portion 235 of the diff case 203. The rotor 213 of the diff case 203, formed with the boss portion 235, is placed in close proximity to the electromagnet 211. The rotor 213 is comprised of the first and second magnetic members 221, 223 and forms a magnetic flux loop 219 in which when the electromagnet 211 is energized, the rotor 213, the pilot clutch 229 and the armature 217 permeate magnetic field lines.

The pilot clutch 229 is comprised of a plurality of outer clutch plates 275, spline connected to the inner periphery of the diff case 203, and a plurality of inner clutch plates 279, spline connected to an outer periphery of a cam ring 277 engaging an outer periphery of the axle 247. The pilot clutch 229 is pressed by the armature 217 to be coupled, causing a differential rotation to exist between the cam ring 277 and the pressure ring 271 to allow the cam mechanism 269 to generate a cam thrust force.

The cam mechanism 269 is comprised of the cam ring 277, the pressure ring 271 disposed on an outer periphery of the axle 247 to be axially movable, and cam balls 281 disposed between the cam ring 277 and the pressure ring 271. As the pilot clutch 229 is coupled, a differential rotation exists between the cam ring 277, connected to the pilot clutch 229, and the pressure ring 271. This causes the cam mechanism 269 to generate a thrust force to move the pressure ring 271 toward the main clutch 215 that in turn is coupled.

The main clutch 215 is comprised of a plurality of outer clutch plates 283 spline connected to the inner periphery of the diff case 203, and a plurality of inner clutch plates 285 spline connected to the outer periphery of the sun gear 267 connected to the axle 247. When the pilot clutch 229 is coupled, the pressure ring 271 moves toward the main clutch 215 thereby coupling the main clutch 215. As the main clutch 215 is coupled, a differential motion of the differential mechanism 205 is limited.

Considerations are made on the rotor 213 of the electromagnetic clutch 201 in terms of a permeating status of magnetic field lines and a delivery status of drive power. Hereunder, the rotor 213 is described in this respect.

The rotor 113, integrally formed with a case body 213, is comprised of the first and second magnetic members 221, 223. The first magnetic member 221 is placed in an area radially outward of the second magnetic member 223 and the first and second magnetic members 221, 223 are unitized in structure intervening a non-magnetic member 287. The non-magnetic member 287 is composed of stainless steel alloy material whose axially extending inner and outer boundaries are subjected to laser beam welding. The non-magnetic member 287 enables the magnetic flux loop 219 in which the magnetic field lines are permeated through the yoke 209, the rotor 213, the pilot clutch 229 and the armature 217. Also, the first magnetic member 221 is formed with the disc portion 225. The ring gear 245 is fixedly secured to the disc portion 225 via the bolts 233. Further, the second magnetic member 223 is formed with a cylindrical section 289. The cylindrical section 289 has an outer periphery formed with a support section 291. The support portion 291 allows the diff case 203 to be rotatably supported on the diff carrier 243 via a bearing 239. Also, the cylindrical section 289 has an inner periphery formed with a sliding portion 293. The sliding portion 239 slidably accommodates therein the axle 247.

Thus, the first magnetic member 221 has an area, forming the magnetic flux loop 219, and the disc portion 225 to which the ring gear is fixedly secured. Moreover, the second magnetic member 223 has an area in which the magnetic flux loop 219 is formed, the support section 291 supported by the diff carrier 243, and the sliding section 293 held in sliding engagement with the axle 247. Accordingly, the rotor 213 needs to be made of material selected in consideration of a permeating status of magnetic field lines, a mounting status with respect to an associated peripheral member and a delivery status of drive power. Hereunder, materials of the rotor 113 are described.

The first magnetic member 221 is made of material such as, for instance, carbon steel casting (SCM415H) "JIS G 5101" and the second magnetic member 223 is made of carbon steel (S10C) "JIS G 4051" for machine structural use. Further, the first magnetic member 221 has higher material rigidity than that of the second magnetic member 223. This is due to the fact that with the first magnetic member 221 to which the ring gear 245 is fixedly secured, drive power (a bending force) resulting from the ring gear 245 in meshing engagement acts on the disc portion 225. Additionally, the sliding section 293 of the second magnetic member 223 is subjected to surface-hardening treatment to minimize sliding wear caused by the axle 247. Also, the support section 291 of the second magnetic member 223 with which the bearing 239 is held in abutting engagement is subjected to surface-hardening treatment such as nitriding with a view to preventing the occurrence of fretting wear.

With such an electromagnetic clutch 201, since the first and second magnetic members 221, 223 are made of different materials, allowing rotor materials to be combined with more than two kinds of materials minimizes limitations caused by the mounting status with respect to the associated peripheral member and the delivery status of drive power. This results in capability of preventing a unit device of an electromagnetic clutch or an apparatus incorporating the electromagnetic clutch from being complicated and largely sized in structure while broadening an application range of an application design.

Further, since the first magnetic member 221 is made of hard material with increased carbon content, a drop occurs in a permeability of magnetic field lines in some degree but the more advantageous effect results in with an increase in an application range of an application design of a unit device of an electromagnetic clutch or an apparatus incorporating the electromagnetic clutch.

Moreover, the first magnetic member 121 is selected to use material with increased rigidity and has capability of bearing phenomena such as torsion or bending resulting from drive torque. This enables an increase in an application range of an application design of a unit device of an electromagnetic clutch or an apparatus incorporating the electromagnetic clutch.

In addition, since the disc portion 225 of the first magnetic member 221 is input with drive torque of the gear 227 of the power delivery system, the disc portion can bear drive torque.

Also, the first magnetic member 221 is made harder than the second magnetic member 223. This allows the disc portion 225 to be easily set to be an input and output interface for drive torque.

Further, since the cylindrical section 289 of the second magnetic member 223 is formed with the sliding section 293 held in sliding engagement with the axle 247 and due to the sliding section 293 being subjected to surface-hardening treatment such as nitriding, the sliding section 293 has minimized sliding wear caused by the axle 247.

In addition, since the cylindrical section 165 of the second magnetic member 223 is formed with the support section 291 to be held in abutting engagement with the bearing 239 and the support section 291 is subjected to surface-hardening treatment such as nitriding, enabling the prevention of the occurrence of fretting wear.

Fourth Embodiment

A fourth embodiment is described below with reference to FIG. 5.

An electromagnetic clutch 301 of the present embodiment is comprised of first and second relative rotary members 303, 305, an electromagnet 311 including a coil 307 and a yoke 309, a rotor 313 placed in close proximity to the electromagnet 311 to permeate magnetic field lines through the yoke 309, a main clutch (friction clutch) 315 through which drive torque is transferred between the first and second relative rotary members 303, 305, and an armature 317 operative to permeate magnetic field lines, delivered from the rotor 313, for controlling the coupling of a pilot clutch (friction clutch) 325. With the electromagnetic clutch 301 of the present embodiment, the rotor 313 is comprised of first and second magnetic members 321, 323, made of different materials, for establishing at least one magnetic flux loop 319.

Figure 5:
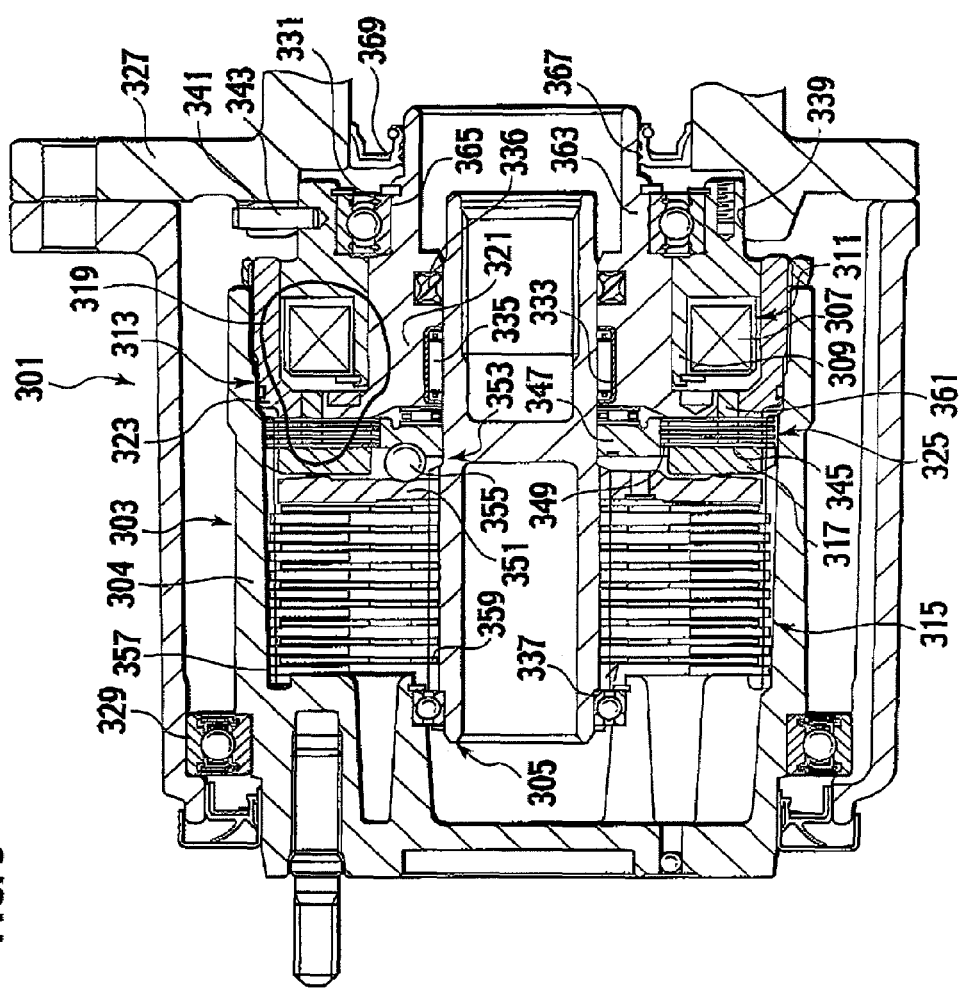
FIG. 5 is a cross-sectional view of an electromagnetic clutch 301 of a fourth embodiment according to the present invention.

As shown in FIG. 5, the first rotary member 303 is comprised of a housing body 304, to which drive torque is input, and the rotor 313, which is fixedly mounted to the housing body 304 and serves as a one end wall portion of the housing body 304. The first rotary member 303 is rotatably supported by a bearing 329, disposed in a carrier (stationary member) 327, and a bearing 331 disposed on the electromagnet 311 fixedly secured to the carrier 327. The first rotary member 303 has an inner periphery formed with a concave portion 333. The second rotary member 305 is supported to be rotatable relative to the first rotary member 303 via a bearing 335, disposed I the concave portion 333, and a bearing 337 disposed in an inner periphery of the first rotary member 303.

The electromagnet 311, comprised of the coil 307 and the yoke 309, is fixedly supported by a support section 339 of the carrier 327 and fixedly secured to the carrier 327 via fixture pins 343 disposed in concave portions 341 of the carrier 327 opening in an axial direction. The rotor 313 is placed in close proximity to one side of the electromagnet 311.

The rotor 313 is integrally formed with the first rotary member 303. The rotor 313, comprised of the first and second magnetic members 321, 323 that will be described later, creates the magnetic flux loop 319 for permeating the magnetic filed lines to the yoke 309, the rotor 313, the pilot clutch 325 and the armature 317 when the electromagnet 311 is energized.

The pilot clutch 325 is comprised of a plurality of outer friction plates 345 spline coupled to the inner periphery of the first rotary member 303, and a plurality of inner friction plates 349 spline coupled to an outer periphery of a cam ring 347 held in engagement with an outer periphery of the second rotary member 305. When the electromagnet 311 is energized, the armature 317 is attracted toward the electromagnet 311 to cause the pilot clutch 325 to be coupled. The armature 317 is disposed on the pilot clutch 325 at one side thereof. As the pilot clutch 325 is coupled upon energizing the electromagnet 311, differential rotation occurs between the cam ring 347 and a pressure ring 351 spline connected to the outer periphery of the second rotary member 305, causing the cam mechanism 353 to generate a cam thrust force.

The cam mechanism 353 is comprised of the cam ring 347, the pressure ring 351, and cam balls 355 disposed between the cam ring 347 and the pressure ring 351. As the cam mechanism 353 generates a cam thrust force, the pressure ring 351 is caused to shift in the axial direction to press the main clutch 315, which is consequently coupled.

The main clutch 315 is comprised of a plurality of outer friction plates 357 spline coupled to one side of the of the first rotary member 303, and a plurality of inner friction plate 359 spline coupled to the outer periphery of the second rotary member 305. As the electromagnet 311 is energized to cause the main clutch 315 to be coupled, the first and second rotary members 303, 305 are coupled to transfer drive torque.

Considerations are made on the rotor 313 of the electromagnetic clutch 301 in terms of a permeating status of magnetic field lines, a mounting status with respect to an associated peripheral member and a delivery status of drive power. Hereunder, the rotor 313 is described.

The rotor 313, integrally formed with the first rotary member 303, is comprised of the first and second magnetic members 321, 323. The first magnetic member 321 is placed radially inward of the second magnetic member 323 and the first and second magnetic members 321, 323 are unitized in structure with the second magnetic member 123 intervening a non-magnetic member 361. Casting a copper ring forms this non-magnetic member 361 between the first and second magnetic members 321, 323. When the electromagnet 311 is energized, the non-magnetic member 361 is able to form a magnetic flux loop 319 in which magnetic field lines are permeated through the yoke 309, the rotor 313, the pilot clutch 325 and the armature 317. Moreover, the first magnetic member 321 is formed with a cylindrical section 363, axially extending in an area outside the magnetic flux loop 319, which has inner and outer peripheries formed with profiles to accommodate contact members such as the bearings 331, 335 and a seal bearing 336 and a seal 367. The outer periphery of the cylindrical section 363 has a support section 365. The support section 365 allows the first rotary member 303 to be rotatably supported on the carrier 327 via the bearing 331. Also, the outer periphery of the cylindrical section 363 has a terminal portion formed with a sliding section 367. The sliding section 367 is held in sliding engagement with the seal 369 disposed between the carrier 327 and the cylindrical section 363.

Thus, the first magnetic member 321 includes a section in which the magnetic flux loop 319 is formed, the support section 365 supported by the carrier 327, and the sliding section 367 held in sliding engagement with the seal 369 disposed between the carrier 327 and the cylindrical section 363. Accordingly, the rotor 313 needs to be made of material selected on the ground of a permeating status of magnetic field lines, a mounting status with respect to an associated peripheral member and a delivery status of drive power. Hereunder, materials of the rotor 313 are described.

The first magnetic member 321 is made of material such as, for instance, carbon steel casting (SCM415H) "JIS G 5101" that has a higher carbon content than that of carbon steel (S10C) "JIS G 4051" for machine structural use to be employed in the second magnetic member 323. Further, the first magnetic member 321 has higher material rigidity than that of the second magnetic member 323. Additionally, the first magnetic member 321 may also be subjected to surface-hardening treatment upon conducting heat treatment such as high-frequency hardening. Also, a facing section 371, facing the yoke 309 of the electromagnet 311 of the first magnetic member 321, and a facing section 373, facing the pilot clutch 325, are subjected to the cutting or grinding.

With such an electromagnetic clutch 301, since the first and second magnetic members 321, 323 are made of different materials, allowing rotor materials to be combined with more than two kinds of materials minimizes limitations caused by the mounting status with respect to the associated peripheral member and the delivery status of drive power. This results in capability of preventing a unit device of an electromagnetic clutch or an apparatus incorporating the electromagnetic clutch from being complicated and largely sized in structure while broadening an application range of an application design.

Further, since the first magnetic member 321 is selectively made of hard material with increased carbon content, a drop occurs in a permeability of magnetic field lines in some degree but the more advantageous effect results in with an increase in an application range of an application design.

Moreover, the first magnetic member 321 is selectively made of material with increased rigidity and has capability of bearing phenomena such as torsion or bending resulting from drive torque. This enables an increase in an application range of an application design.

In addition, the first magnetic member 321 has a smaller diameter than the second magnetic member 323 and is selectively made of material with increased rigidity, enabling the suppression of an increase in wall thickness that would be needed in consideration of a mounting status with respect to an associated peripheral member and a delivery status of drive power. Further, the first magnetic member 321, disposed in a radially inner peripheral area, can be designed to have a shape in consideration a status to be mounted to a peripheral member. This results in capability of preventing a unit device of an electromagnetic clutch or an apparatus incorporating the electromagnetic clutch from being largely sized in structure while broadening an application range of an application design.

Moreover, since the cylindrical section 363 of the first magnetic member 321 is formed with the support section 365 on a side closer to the carrier 327, material setting can be made on consideration of the support member 365. Also, the first magnetic member 321 is made harder than the second magnetic member 323. This allows the support section 365 to have a shape that can be easily set.

Further, in a case where the first magnetic member 321, formed with the sliding section 367 in sliding engagement with the seal 369, is subjected to. surface hardening treatment such as high-frequency hardening, the sliding section 367 can minimize sliding wear resulting from the seal 369.

In addition, in a case where the first magnetic member 321, formed with the support section 365 with which the bearing 331 is held in abutting engagement, is subjected to surface-hardening treatment such as high-frequency hardening, a fretting phenomenon can be prevented.

Also, with the fourth embodiment, the first magnetic member may bear reference numeral "323" and the second magnetic member may bear reference numeral "321". In such a case, since the first magnetic member 323 is located in an area outward of the magnetic flux loop 319, the magnetic flux loop 319 is easy to have an increased flux path cross-sectional area and even if a carbon content in material forming the second magnetic member 321 increases in some degree, the first magnetic member 323 is prevented from being largely sized in structure. In other word, since the cylindrical section is located in an area outside the magnetic flux loop 319, the cylindrical section has no adverse affect on the magnetic flux loop 319. This enables a friction clutch to have a reliable coupling characteristic. The second magnetic member 321 is selectively made of material with low carbon content to provide improved magnetic flux permeability while enabling the improvement in cutting capability in conformity to a layout and configuration of an associated contact member. This prevents a whole of the electromagnetic clutch from being sized in a large structure.

Fifth Embodiment

A fifth embodiment is described below with reference to FIGS. 6 and 7.

An electromagnetic clutch 401 of the present embodiment is comprised of a first and second relative rotary members, an electromagnet 411 including a coil 407 and a yoke 409, a rotor 413 placed in close proximity to the electromagnet 411 to permeate magnetic field lines through the yoke 409, a friction clutch 415 through which drive torque is transferred between the first and second relative rotary members, and an armature 417 operative to permeate the magnetic field lines, delivered from the rotor 413, for controlling the coupling of a friction clutch. With the electromagnetic clutch 401 of the present embodiment, the rotor 413 is comprised of first, second and third magnetic members 421, 423, 425 for establishing at least one magnetic flux loop 419. The first to third magnetic members 421, 423, 425 are made of different materials. Also, with the present embodiment, the first and second relative rotary members are not illustrated and the friction clutch 415 is shown in a schematic view. A structure of the present embodiment can be applied to other embodiments with similar advantageous effect being obtained.

Figure 6:
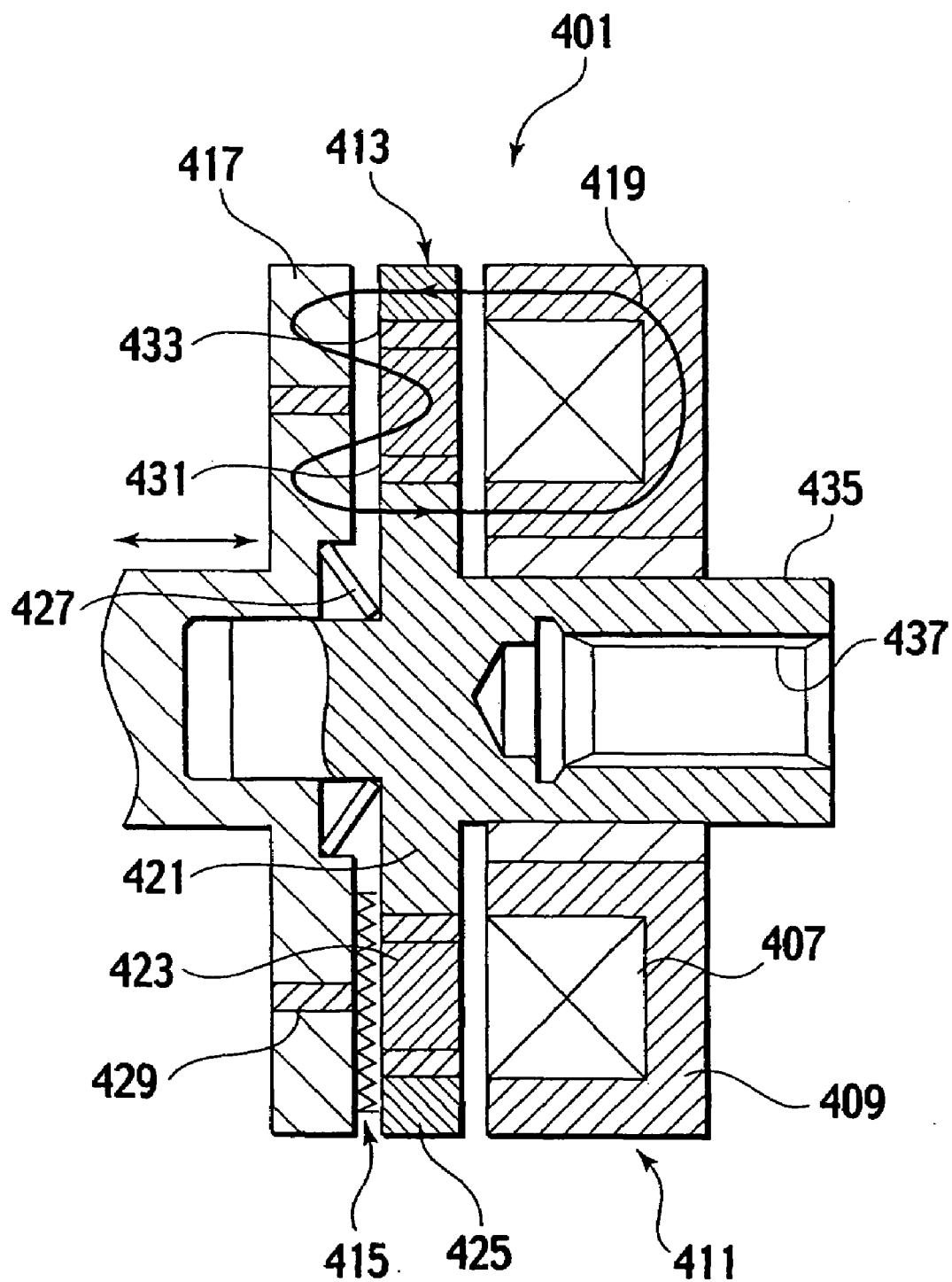
FIG. 6 is a cross-sectional view of an electromagnetic clutch 401 of a fifth embodiment according to the present invention.
Figure 7:
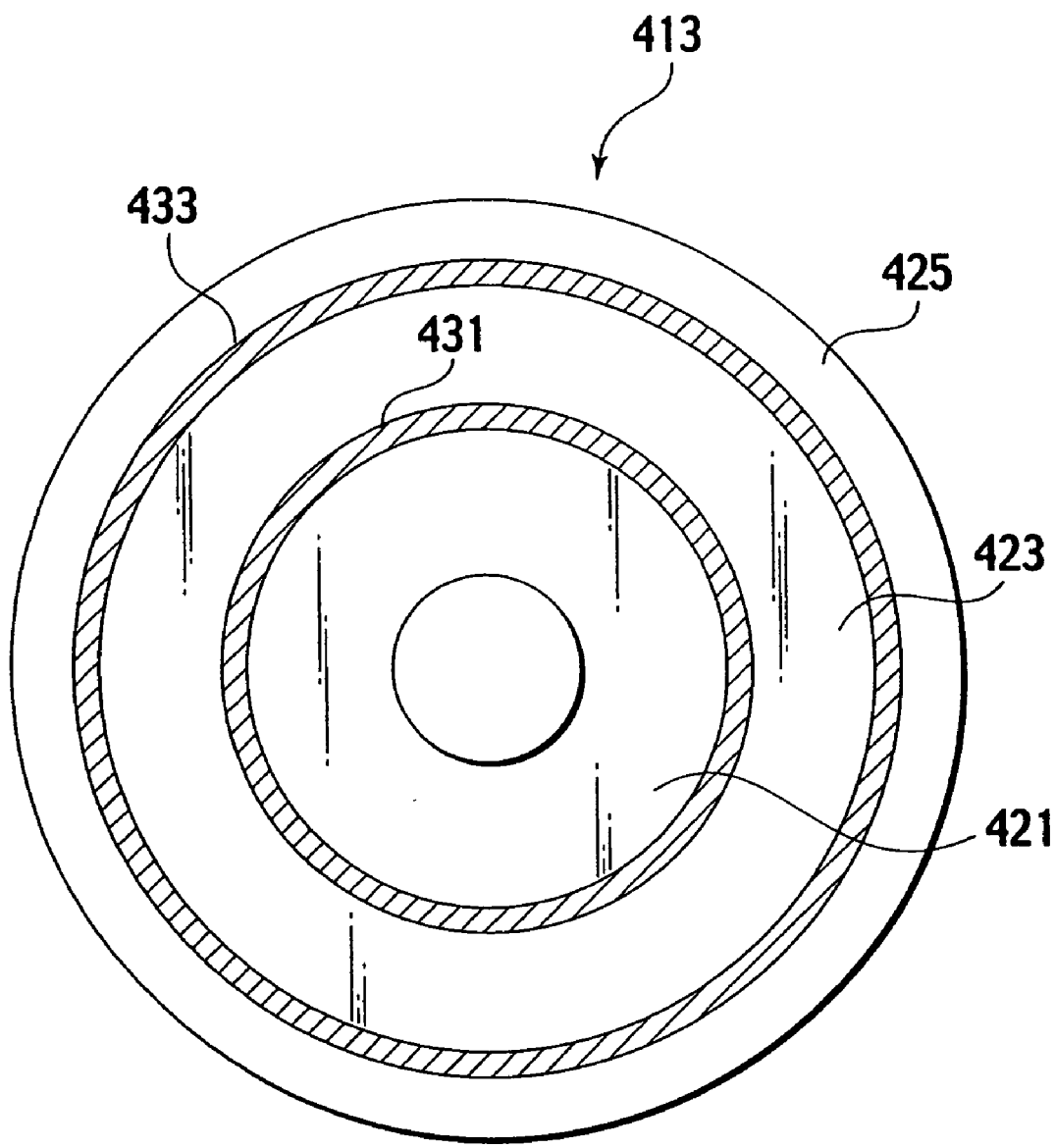
FIG. 7 is a side view showing a rotor 41 3 forming part of the electromagnetic clutch shown in FIG. 6.

As shown in FIGS. 6 and 7, the electromagnet 311, comprised of the coil 407 and the yoke 409, is fixedly secured to a stationary member (not shown). The rotor 413 is placed in close proximity to the electromagnet 411 on one side thereof.

The rotor 413, comprised of the first to third magnetic members 421, 423, 425, allows a magnetic flux loop 413 to be formed for permeating magnetic field lines through the yoke 409, the rotor 413, the friction clutch 415 and the armature 417. Moreover, a return spring 427 is disposed between the armature 417 and the rotor 413 thereby urging the armature 417. Also, the armature 417 is formed with a non-magnetic member 429.

The first magnetic member 421 is placed radially inward of the second magnetic member 423 and the first and second magnetic members 421, 423 are integrally provided via non-magnetic member 431. Non-magnetic member 431 includes a copper ring press fitted to between the first and second magnetic members 421, 423 and brazed thereto. The second magnetic member 423 is placed radially inward of the third magnetic member 425 and the second and third magnetic members 423, 425 are integrally provided via a non-magnetic member 433. The non-magnetic member 433 includes a copper ring press fitted to between the second and third magnetic members 423, 425 and brazed thereto. Also, the first magnetic member 421 is formed with axially extending cylindrical section 435. The cylindrical section 435 has an inner periphery formed with a coupling section 437, to which the other drive member is connected.

Thus, the rotor 413, comprised of a plurality of magnetic members 421, 423, 425, needs to be made of material selected in consideration of a permeating status of magnetic field lines, a mounting status with respect to an associated peripheral member and a delivery status of drive power. Hereunder, materials of the rotor 413 are described.

The first magnetic member 421 is made of material such as, for instance, carbon steel casting (SCM415H) "JIS G 5101" and the second magnetic member 423 is made of carbon steel (S10C) "JIS G 4051" for machine structural use. Further, the third magnetic member 425 is made of carbon steel (S30C) "JIS G 4051" for machine structural use. In setting these materials, the first magnetic member 421 has the coupling section 437 and is made of material selected in consideration of a delivery of drive torque. The second magnetic member 423 diffracts the magnetic field lines like the magnetic flux loop 419 and is made of material with the highest magnetic flux permeability. The third magnetic member 425 plays a role as the outermost peripheral member and is made of material selected to be hardened so as to enable the prevention of deformation occurring during high-speed rotation or thermal expansion. Also, the coupling section 437 of the cylindrical section 435 of the first magnetic member 421 is subjected to surface-hardening treatment such as carburizing, nitriding and high-frequency heat treatment.

With such an electromagnetic clutch 401, since the first to third magnetic members 421, 423, 425 are made of different materials, allowing rotor materials to be composed of more than two kinds of materials in combination minimizes limitations caused by the mounting status with respect to the associated peripheral member and the delivery status of drive power. This results in capability of preventing a unit device of an electromagnetic clutch or an apparatus incorporating the electromagnetic clutch from being complicated and largely sized in structure while broadening an application range of an application design.

Further, in selecting materials for the respective magnetic members, different materials may be selected in view of a mounting status with respect to an associated peripheral member, such as sustaining environments including coupling shapes, supporting shapes, contact states, sliding situations, heat resistance, weather resistance and corrosion resistance of magnetic members, and a delivery status of drive power.

Further, while the electromagnetic clutch has been described with reference to an example wherein using a magnetic force allows drive torque to be connected or disconnected between a pair of rotary members, the structure of the present invention may have application to a general-purpose machine with a structure wherein using a magnetic force allows drive torque to be connected or disconnected between a pair of rotary members.

The entire contents of Japanese Patent Application Laid-open No. P2005-182122 with a filing data of Jun. 22, 2005 is herein incorporated by reference.

Although the present invention has been described above by reference to certain embodiments of the invention, the invention is not limited to the embodiments described above and modifications will occur to those skilled in the art, in light of the teachings. The scope of the invention is defined with reference to the following claims.

What is claimed is:

1. An electromagnetic clutch comprising:
   first and second rotary members rotatable relative to each other;
   an electromagnet having a coil and a yoke;
   a rotor placed in close proximity to the electromagnet and through which magnetic field lines generated by the electromagnet are permeated, the rotor is associated with the first rotary member;
   a friction clutch operative to transfer drive torque between the first and second rotary members;
   an armature through which permeating magnetic field lines coming from the rotor are permeated to control coupling of the friction clutch;
   wherein the rotor includes first and second magnetic members for forming magnetic flux loops and the first and second magnetic members are made of materials different from each other, and
   wherein the first magnetic member is made of the material with a higher carbon content than that of the material of the second magnetic member.

2. The electromagnetic clutch according to claim 1, wherein the first magnetic member includes a coupling section to be connected to a drive member.

3. The electromagnetic clutch according to claim 2, wherein
   at least the coupling section is subjected to surface-hardening treatment.

4. The electromagnetic clutch according to claim 2, wherein the first magnetic member includes an axially extending cylindrical section located outside the magnetic flux loops.

5. The electromagnetic clutch according to claim 1, wherein
   the first magnetic member includes a transfer section though which drive torque is transferred from a drive member.

6. The electromagnetic clutch according to claim 1, wherein one of the first magnetic member and the second magnetic member includes an axially extending cylindrical section formed with a sliding section in sliding engagement with a rotary member.

7. The electromagnetic clutch according to claim 1, wherein one of the first magnetic member and the second magnetic member includes an axially extending cylindrical section formed with a support section supported on a stationary member.

8. The electromagnetic clutch according to claim 1, wherein
   the rotor is associated with the first rotary member by being integrally formed with the first rotary member.

9. An electromagnetic clutch comprising:
   first and second rotary members rotatable relative to each other;
   an electromagnet having a coil and a yoke;
   a rotor placed in close proximity to the electromagnet and through which magnetic field lines generated by the electromagnet are permeated, the rotor is associated with the first rotary member;
   a friction clutch operative to transfer drive torque between the first and second rotary members;
   an armature through which magnetic field lines coming from the rotor are permeated to control coupling of the friction clutch;
   wherein the rotor includes first and second magnetic members for forming magnetic flux loops and the first and second magnetic members are made of materials different from each other, and
   wherein the first magnetic member is made of the material with higher rigidity than that of the material of the second magnetic member.

10. The electromagnetic clutch according to claim 9, wherein
the first magnetic member is placed radially inward of the second magnetic member.

11. The electromagnetic clutch according to claim 9, wherein
the first magnetic member includes a coupling section to be connected to a drive member.

12. The electromagnetic clutch according to claim 11, wherein
the first magnetic member includes an axially extending cylindrical section located outside the magnetic flux loops.

13. The electromagnetic clutch according to claim 9, wherein
the first magnetic member includes a transfer section through which drive torque is transferred to a drive member.

14. The electromagnetic clutch according to claim 9, wherein
one of the first magnetic member and the second magnetic member includes an axially extending cylindrical section formed with a sliding section in sliding engagement with a rotary member.

15. The electromagnetic clutch according to claim 9, wherein
one of the first magnetic member and the second magnetic member includes an axially extending cylindrical section formed with a support section supported on a stationary member.

16. The electromagnetic clutch according to claim 9, wherein
the rotor is associated with the first rotary member by being integrally formed with the first rotary member.

* * * * *